United States Patent
Mahadev et al.

(10) Patent No.: US 12,079,167 B1
(45) Date of Patent: Sep. 3, 2024

(54) SCALING DELTA TABLE OPTIMIZE COMMAND

(71) Applicant: Databricks, Inc., San Francisco, CA (US)

(72) Inventors: Rahul Shivu Mahadev, San Francisco, CA (US); Burak Yavuz, San Francisco, CA (US); Tathagata Das, New Haven, CT (US)

(73) Assignee: Databricks, Inc., San Francisco, CA (US)

( * ) Notice: Subject to any disclaimer, the term of this patent is extended or adjusted under 35 U.S.C. 154(b) by 0 days.

(21) Appl. No.: 18/093,916

(22) Filed: Jan. 6, 2023

Related U.S. Application Data (63) Continuation of application No. 17/384,486, filed on Jul. 23, 2021, now Pat. No. 11,567,900.

(51) Int. Cl.
*G06F 16/172* (2019.01)
*G06F 16/22* (2019.01)

(52) U.S. Cl.
CPC ........ *G06F 16/172* (2019.01); *G06F 16/2282* (2019.01)

(58) Field of Classification Search
CPC .............. G06F 16/1734; G06F 16/172; G06F 16/1744; G06F 16/2282; G06F 2201/81; G06F 11/1435
See application file for complete search history.

(56) References Cited

U.S. PATENT DOCUMENTS

| | | | |
|---|---|---|---|
| 8,006,189 B2 * | 8/2011 | Dachs | G11B 27/329 |
| | | | 715/723 |
| 10,769,130 B1 | 9/2020 | Armbrust et al. | |
| 2002/0083064 A1 * | 6/2002 | Davis | G06F 16/00 |
| 2007/0110277 A1 | 5/2007 | Hayduchok et al. | |
| 2013/0218908 A1 * | 8/2013 | Chu | G06F 16/27 |
| | | | 707/752 |
| 2018/0275907 A1 | 9/2018 | Subramanian et al. | |
| 2020/0311026 A1 | 10/2020 | Du et al. | |
| 2020/0366699 A1 | 11/2020 | Sampaio et al. | |
| 2021/0209831 A1 * | 7/2021 | Mantor | G06T 15/005 |
| 2021/0257047 A1 | 8/2021 | Zhu et al. | |
| 2021/0398082 A1 * | 12/2021 | Trevisiol | G06Q 10/1053 |
| 2022/0050734 A1 * | 2/2022 | Porzio | G06F 11/0772 |
| 2022/0261390 A1 * | 8/2022 | Creasey | G06F 16/2282 |

\* cited by examiner

*Primary Examiner* — Etienne P Leroux
(74) *Attorney, Agent, or Firm* — Fenwick & West LLP (57) ABSTRACT

The interface is to receive an indication to execute an optimize command. The processor is to receive a file name; determine whether adding a file of the file name to a current bin causes the current bin to exceed a threshold; associate the file with the current bin in response to determining that adding the file does not cause the current bin to exceed the bin threshold; in response to determining that adding the file to the current bin causes the current bin to exceed the bin threshold: associate the file with a next bin, indicate that the current bin is closed, and add the current bin to a batch of bins; determine whether a measure of the batch of bins exceeds a batch threshold; and in response to determining that the measure exceeds the batch threshold, provide the batch of bins for processing.

17 Claims, 7 Drawing Sheets

SCALING DELTA TABLE OPTIMIZE COMMAND

CROSS-REFERENCE TO RELATED APPLICATIONS

The present application is a continuation of U.S. application Ser. No. 17/384,486 filed on Jul. 23, 2021, which is incorporated by reference in its entirety.

BACKGROUND

A cluster based data processing system including a driver node and zero or more worker nodes processes data stored in data files. Data files are provided by data collection processes in large and small sizes. Commonly new data is output as it is collected in small update files. Efficiency is improved by consolidating small data files into large update files using an optimize command. The optimize command typically reads metadata associated with each file for consolidation onto the driver node. The driver node then uses the metadata to assign data files into bins, which are consolidated to form larger data files by the worker nodes. In the event a large number of files are to be consolidated, the metadata on the driver node can overwhelm its memory capacity, causing it to crash and processing to fail. This creates a problem wherein a command intended to mitigate problems that occur as a result of storing too many small files itself fails due to too many small files.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system comprises a communication interface configured to receive an indication to execute an optimize command and a processor configured to receive a file name, determine whether adding a file associated with the file name to a current bin causes the current bin to exceed a bin threshold, in response to determining that adding the file to the current bin does not cause the current bin to exceed the bin threshold, associate the file name with the current bin, in response to determining that adding the file to the current bin causes the current bin to exceed the bin threshold, associate the file name with a next bin, indicate that the current bin is closed, and add the current bin to a batch of bins, determine whether a number of bins of the batch of bins exceeds a batch threshold, and in response to determining that the number of bins of the batch of bins exceeds the batch threshold, provide the batch of bins for processing.

A system comprises a system for a delta table optimize command. For example, the system for a delta table optimize command comprises a cluster system including a driver system and a plurality of worker systems. A large number of data files are stored by the system for a delta table optimize command—for example, distributed across the data storage capacity of the plurality of worker systems. An optimal file layout comprises a smaller number of data files—for example, created by compacting a plurality of the input files into a smaller number of output files. For example, files are compacted at a ratio of approximately 3 input to 1 output; 10 input to 1 output; 30 input to 1 output; 100 input to 1 output; 300 input to 1 output; 1000 input to 1 output; 3000 input to 1 output; etc. In a traditional file optimization process, metadata associated with each file for file optimization is provided to the driver system. The driver system analyzes the metadata collection and determines whether each file is to be part of the file optimization process, and in the event the file is to be part of the file optimization process, which bin of a set of bins the file is to be associated with. Bin assignments are provided by the driver to the worker systems, and the worker systems compact the files into new larger files. This process requires the metadata associated with each file of the large set of input files to be entirely loaded on the driver system at one time, causing the driver system to crash in the event that the set of input files is too large.

In some embodiments, the binpacking along with a snap shot isolation capability disclosed herein is used in formats other than delta.

The system for a delta table optimize command assigns files to bins in an iterative process that does not risk overwhelming the driver memory. A delta table comprising information describing the set of input files is received by the driver from the worker systems and sorted. A small group of metadata files are read according to the delta table. For example, a group of metadata files comprises 5 metadata files, 20 metadata files, 50 metadata files, etc. Each metadata file of the group of metadata files is analyzed to determine whether it should be assigned to a bin. In the event it is determined to assign the metadata file to a bin, a current bin is tested to determine whether adding the metadata file to the current bin causes a bin threshold to be exceeded. In the event that adding the metadata file to the current bin does not cause the bin threshold to be exceeded, the metadata file is assigned to the current bin. In the event that adding the metadata file to the current bin causes the bin threshold to be exceeded, the current bin is marked as completed, and the metadata file is assigned to a next bin, which is then indicated as the new current bin. The process continues in this way while counting the number of completed bins. Once the number of completed bins reaches a number of completed bins threshold value, bin information is provided to the worker systems of the cluster system and the compaction process is executed. In some embodiments, bin information is provided to the worker systems of the cluster system and the compaction process is executed in response to all the files in the delta table having been processed. The number of completed bins is reset and the process resumes iteratively assigning files to bins, then processing the bins using the worker systems, until all metadata files indicated in the delta table have been checked and compacted if appropriate.

The process additionally performs a system-wide check to ensure that multiple instances of the delta table optimize command do not together overwhelm the driver system memory. This is accomplished by counting the total number of files assigned to bins but not yet compacted. A global file total is maintained across all instances of the delta table optimize command. In response to the global file total reaching a global file limit, assignment of files to bins is stopped, completed bins are processed, and assignment of files to bins is resumed. If there are not completed bins to process, a single delta table optimize command process is assigned a driver level overallocation lock indicating that that process is allowed to overallocate files (e.g., continue allocating files after the global file total has been reached). The process assigned the overallocation lock continues allocating files to its current bin until the bin is full, then provides the bin for processing. Once the bin has completed processing, the driver memory associated with the files in the bin is freed, the driver level overallocation lock is released, and the process resumes allocating files to bins.

In various embodiments, bin packing is based on a number of rows, a number of columns, a number of rows and a number of columns, a number of rows times a number of columns, or any other appropriate portion of an array or measure of an array. In some embodiments, the bin packing splits files in response to a file having more rows greater than a threshold number of rows.

For example, the system for the delta table optimize command improves the computer by performing an optimize command for consolidating files without any risk of driver system crash as a result of too many files for consolidation. Operating using a system with a risk of driver system crash requires a system administrator to be observant of the total number of files accumulated for consolidation and ensure that execution of the consolidation process before the number becomes too great, adding an additional burden and potentially requiring the consolidation process to be executed at a time (e.g., during peak business hours) when it is preferable not to be consolidating files.

Figure 1:
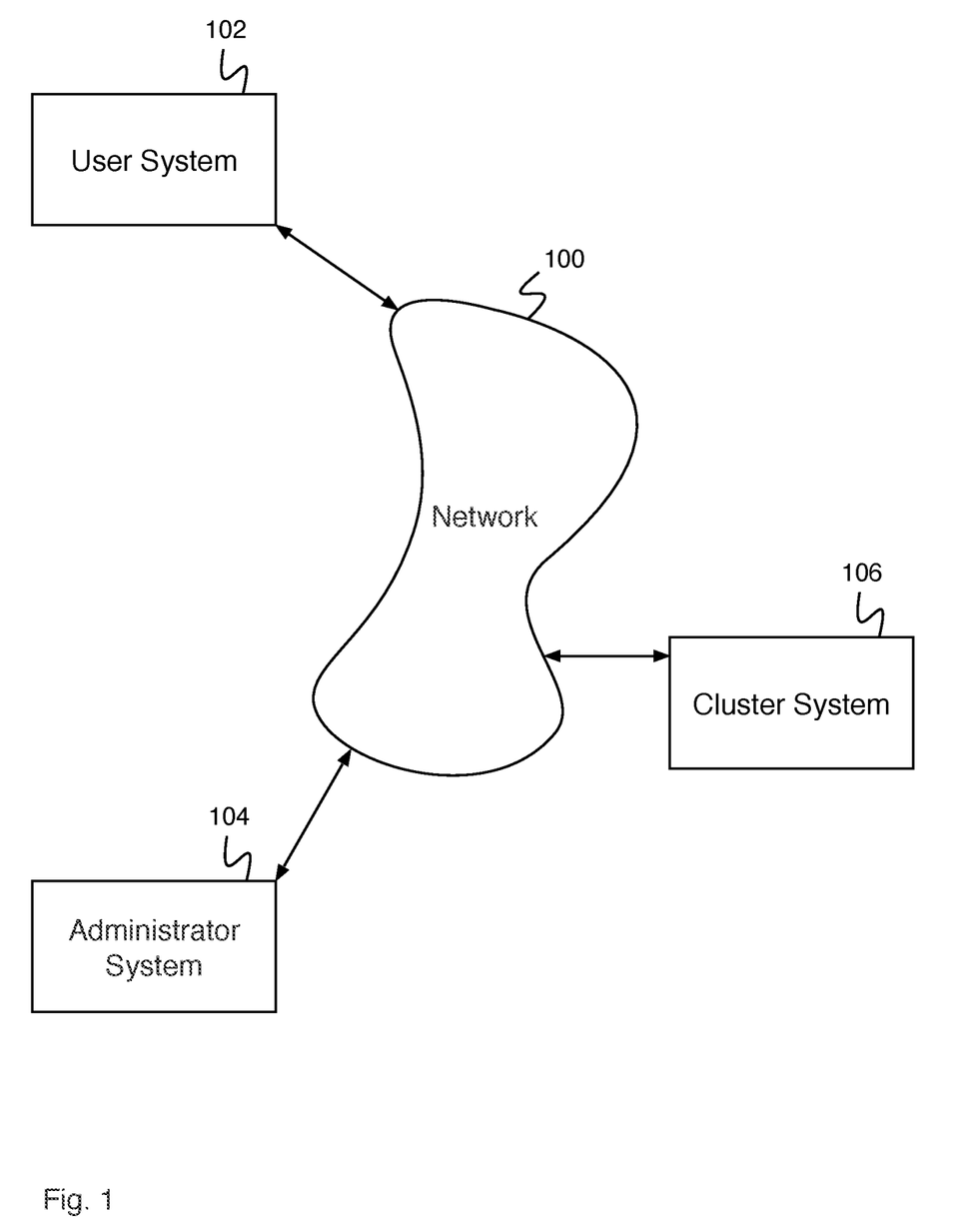
FIG. 1 is a block diagram illustrating an embodiment of a network system.

FIG. 1 is a block diagram illustrating an embodiment of a network system. In some embodiments, the network system of FIG. 1 comprises a system for a delta table optimize command. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, administrator system 104, and cluster system 106 communicate via network 100.

User system 102 comprises a user system for use by a user. For example, user system 102 comprises a system for communication, data access, computation, etc. A user uses user system 102 to access database system commands utilizing cluster system 106—for example, to add data, remove data, modify data, process data, execute database queries, etc. For example, cluster system 106 comprises a cluster-based database system for storing database data (e.g., large amounts of database data, big data, etc.), processing database commands, determining computation values, executing queries, etc.

Administrator system 104 comprises an administrator system for use by an administrator. For example, administrator system 104 comprises a system for communication, data access, computation, etc. An administrator uses administrator system 104 to maintain cluster system 106. For example, an administrator uses administrator system 104 to start and/or stop services on cluster system 106, to reboot cluster system 106, to install software on cluster system 106, to add, modify, and/or remove data on cluster system 106, etc.

Cluster system 106 comprises a cluster database system for storing data, executing queries on data, providing query results, etc. utilizing a plurality of computers comprising one or more driver nodes and a plurality of worker nodes. For example, cluster system 106 comprises a communication interface configured to receive an indication to execute an optimize command and a processor configured to receive a file name, determine whether adding the file associated with the file name to a current bin causes the current bin to exceed a bin threshold, in response to determining that adding the file to the current bin does not cause the current bin to exceed the bin threshold, associate the file name with the current bin, in response to determining that adding the file to the current bin causes the current bin to exceed the bin threshold, associate the file name with a next bin, indicate that the current bin is closed, and add the current bin to a batch of bins, determine whether a number of bins of the batch of bins exceeds a batch threshold, and in response to determining that the number of bins of the batch of bins exceeds the batch threshold, provide the batch of bins for processing.

In some embodiments, the system executes using a single node instead of cluster system 106.

Figure 2:
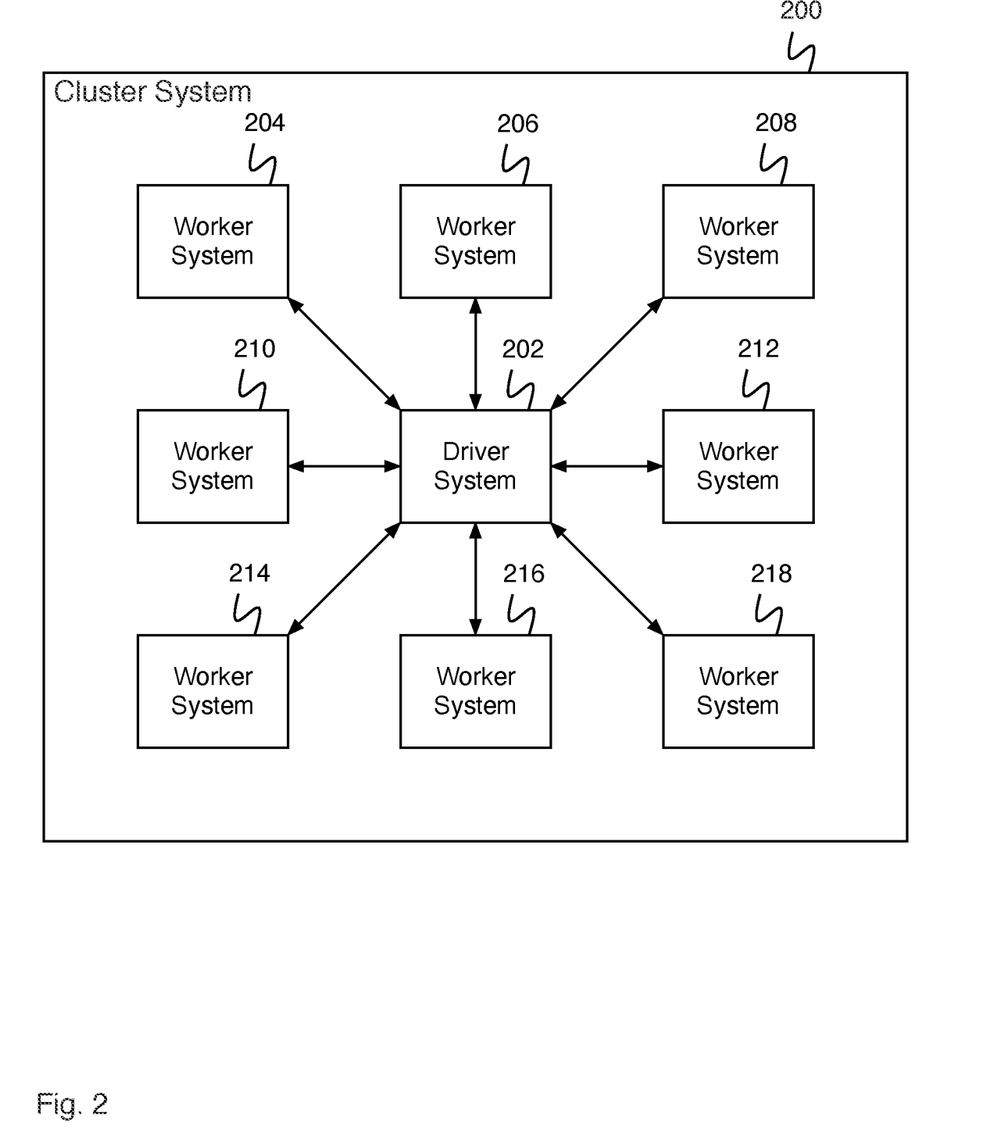
FIG. 2 is a block diagram illustrating an embodiment of a cluster system.

FIG. 2 is a block diagram illustrating an embodiment of a cluster system. In some embodiments, cluster system 200 comprises cluster system 106 of FIG. 1. In the example shown, cluster system 200 comprises driver system 202 in communication with a plurality of worker systems (e.g., worker system 204, worker system 206, worker system 208, worker system 210, worker system 212, worker system 214, worker system 216, and worker system 218). In some embodiments, cluster system 200 comprises more than one driver system (e.g., each driver system associated with a disjoint set of worker systems). Driver system 202 receives commands (e.g., database processing commands, requests for data output, data for storage, commands from a user system, commands from an administrator system, etc.). Driver system 202 determines work requests for the worker systems, provides the work requests to the worker systems, receives work results from the worker systems, assembles the work results into a request result, provides the request result, etc. The worker systems of the cluster system store data, receive work requests from driver system 202, process the work requests, and provide work results to driver system 202.

Figure 3:
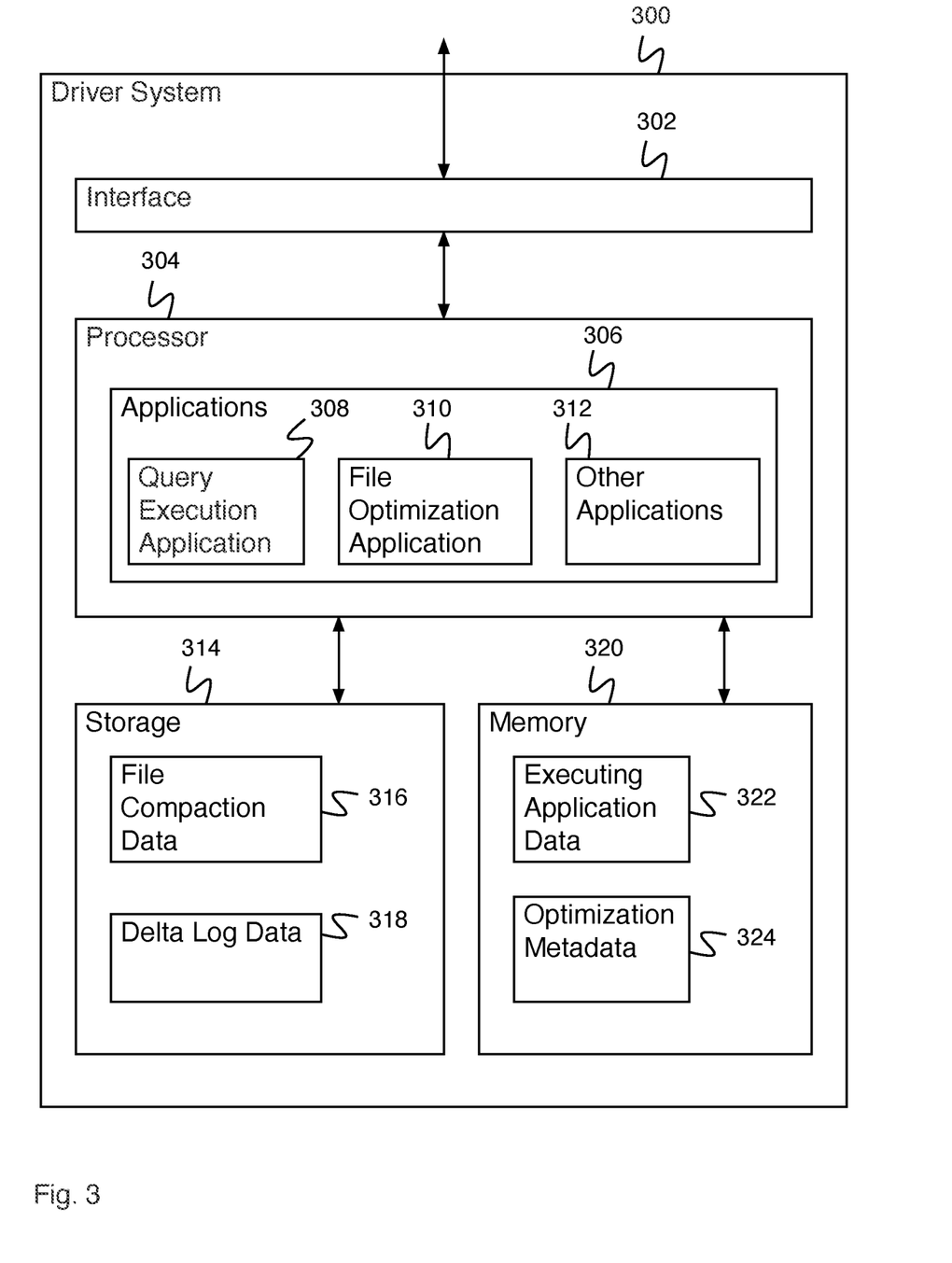
FIG. 3 is a block diagram illustrating an embodiment of a driver system.

FIG. 3 is a block diagram illustrating an embodiment of a driver system. In some embodiments, driver system 300 comprises driver system 202 of FIG. 2. In the example shown, cluster system 300 comprises interface 302. For example, interface 302 comprises an interface for receiving data, providing data, receiving a request to delete or modify data, receiving a database query, providing a database query response, providing a work request to a worker system, receiving a work result from a worker system, etc. Processor 304 comprises a processor for executing applications 306. Applications 306 comprise query execution application 308, file optimization application 310, and other applications 312. Query execution application 308 comprises an application for executing a database query (e.g., a SQL query). For example, the database query is executed on data stored by storage 314 or on data stored by a worker system. File optimization application 310 comprises an application for compacting a set of small files into one or more larger files. For example, file optimization application 310 comprises an application configured to determine whether adding the file name to a current bin causes the current bin to exceed a bin threshold, in response to determining that adding the file associated with the file name to the current bin does not cause the current bin to exceed the bin threshold, associate the file name with the current bin, in response to determining that adding the file to the current bin causes the current bin to exceed the bin threshold, associate the file name with a next bin, indicate that the current bin is closed, and add the current bin to a batch of bins, determine whether a number of bins of the batch of bins exceeds a batch threshold, and in response to determining that the number of bins of the batch of bins exceeds the batch threshold, provide the batch of bins for processing. Other applications 312 comprises any other appropriate applications—for example, an index maintenance application, a communications application, a chat application, a web browser application, a document preparation application, a report preparation application, a user interface application, a data analysis application, etc. Storage 314 comprises file compaction data 316 (e.g., data describing file compaction planning—for example, bin data) and delta log data 318 (e.g., a delta log comprising indications of files for compaction). Memory 320 comprises executing application data 322 comprising data associated with applications 306 and optimization metadata comprising metadata associated with files for compaction.

Figure 4:
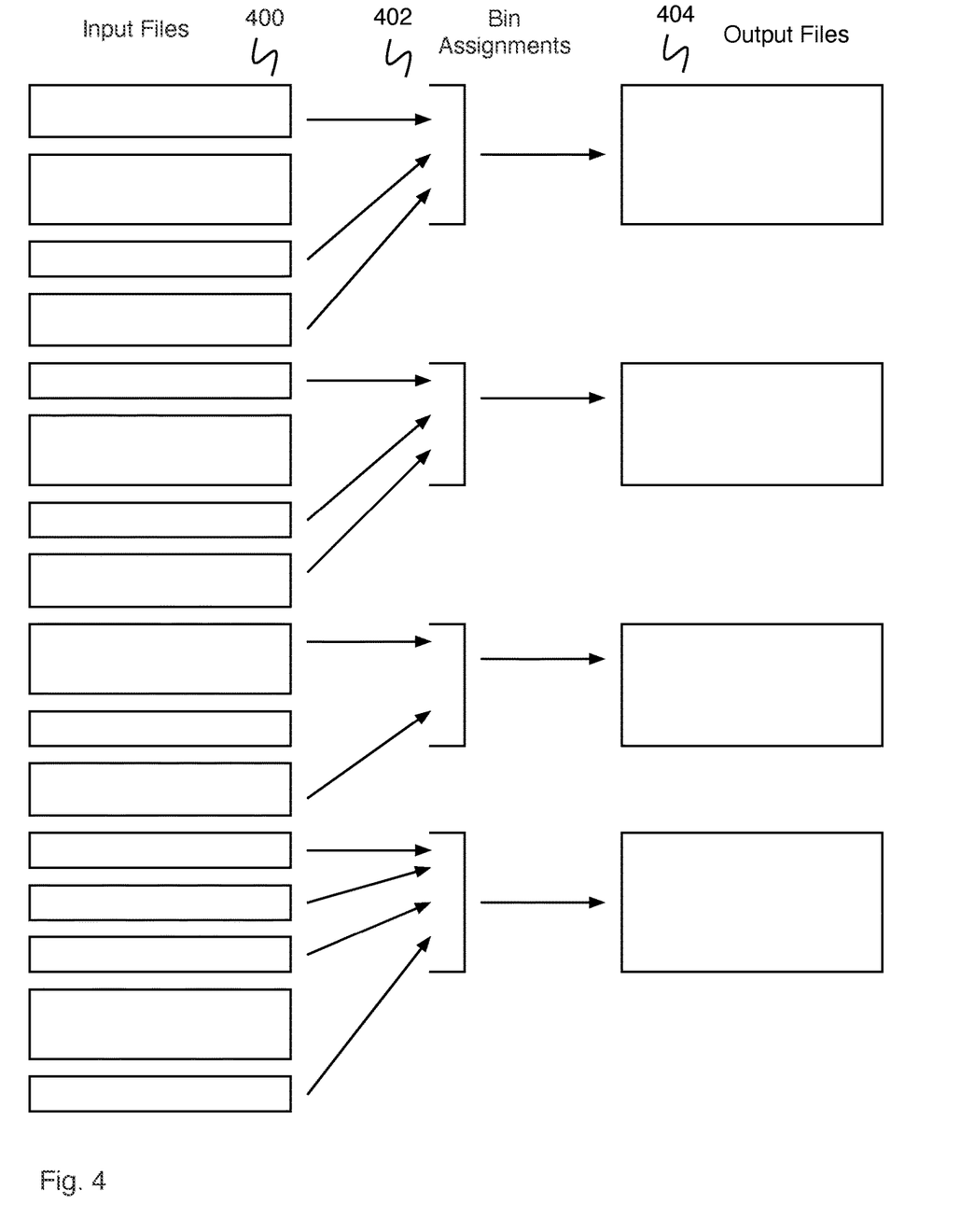
FIG. 4 is a diagram illustrating an embodiment of a file compaction process.

FIG. 4 is a diagram illustrating an embodiment of a file compaction process. In some embodiments, the process depicted in FIG. 4 is associated with file optimization application 310 of FIG. 3. In the example shown, input files 400 comprises a plurality of input files for compaction. Files of input files comprise files of different sizes. Bin assignments 402 comprise bin assignments indicating a set of files of input files 400 associated with each bin of a set of bins. In the example shown, not all of the files of input files 400 are assigned to a bin (e.g., some files of input files 400 are not compacted). Bin assignments 402 indicate bin assignments for producing a set of files of approximately the same size (e.g., not exactly the same size) after compaction. Assignments of input files to bins is determined by a process for a delta table optimize command on a driver system. For example, bin assignments 402 are provided to worker systems of a cluster system for compaction. Worker systems compact files of input files 400 according to bin assignments 402, producing output files 404.

Figure 5:
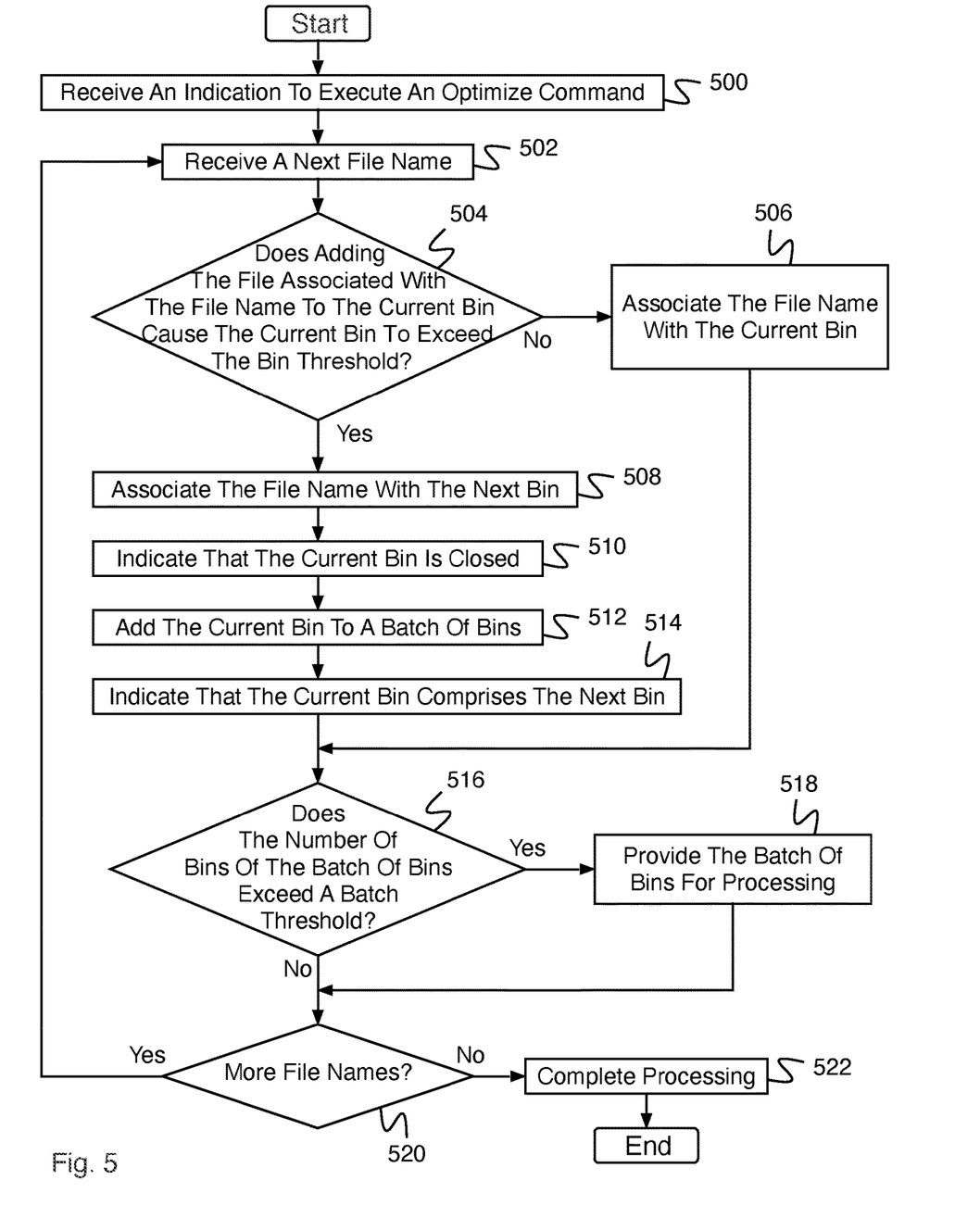
FIG. 5 is a flow diagram illustrating an embodiment of a process for file optimization.

FIG. 5 is a flow diagram illustrating an embodiment of a process for file optimization. In some embodiments, the process of FIG. 5 is executed by cluster system 106 of FIG. 1. In the example shown, in 500, an indication to execute an optimize command is received. In 502, a next file name is received. In some embodiments, the next file name comprises the first file name. In some embodiments, receiving a file name comprises receiving a delta log (e.g., a next file name is determined using the metadata of a single file in the delta log). In some embodiments, the delta log is ordered (e.g., by size, by timestamp, by user, by owner, by create date, by modify date, by operation, associated metadata field, etc.) to generate an ordered delta log. For example, the next file name comprises a next file name of the ordered delta log. In various embodiments, the file name comprises a file identifier, a file location, file metadata, or any other appropriate file information. In 504, it is determined whether adding the file associated with the file name to the current bin causes the current bin to exceed the bin threshold. For example, the bin threshold comprises 100 MB of file data, 500 MB of file data, 1 GB of file data, 2 GB of file data, etc. In the event it is determined that adding the file to the current bin does not cause the current bin to exceed the bin threshold, control passes to 506. In 506, the file name is associated with the current bin. Control then passes to 516. In the event it is determined in 504 that adding the file name to the current bin causes the current bin to exceed the bin threshold, control passes to 508. In 508, the file name is associated with the next bin. In 510, the process indicates that the current bin is closed. In 512, the current bin is added to a batch of bins. In 514, the process indicates that the current bin comprises the next bin (e.g., a next bin of a set of bins becomes the new current bin). In 516, it is determined whether the number of bins of the batch of bins exceeds a batch threshold. In some embodiments, the number of bins of the batch of bins includes bins associated with a global set of batches of bins (e.g., comprising batches of bins associated with other instances of the optimize command executing on the same driver and/or the same processor). In some embodiments, determining whether the number of bins of the batch of bins exceeds a batch threshold additionally comprises a process for a batch file threshold. In some embodiments, in 516 it is determined whether a measure of the batch of bins exceeds a batch threshold. In various embodiments, the measure of the batch of bins comprises a total number of rows, a total number of columns, a total number of rows times a total number of columns, or any other appropriate measure of data instead of bins exceeding a threshold as a test to determine whether to begin processing the batch. In some embodiments, the measure of the batch of bins comprises a number of bins of the batch of bins. In some embodiments, the number of bins of the batch of bins includes bins associated with a global set of batches of bins. In some embodiments, the global set of batches of bins comprises batches of bins associated with other instances of the optimize command executing on the same driver and/or the same processor. In some embodiments, determining whether a measure of the batch of bins exceeds a batch threshold comprises determining whether a number of bins of the batch of bins exceeds a batch threshold. In some embodiments, determining whether a number of bins of the batch of bins exceeds a batch threshold comprises determining whether a number of files associated with bins of the batch of bins exceeds a batch file threshold. In some embodiments, the processor is further configured to, in response to determining that a number of files associated with bins of the batch of bins exceeds a batch file threshold, pause the current bin and provide the batch of bins for processing. In some embodiments, the processor is further configured to determine whether the batch of bins comprises no completed bins, and in response to determining that the batch of bins comprises no bins: assign a driver level overallocation lock to the optimize command; continue to receive next file names until the current bin exceeds the bin threshold; and provide the current bin for processing. In the event it is determined that the measure of the batch of bins does not exceed the batch threshold, control passes to 520. In the event it is determined that the measure exceeds the batch threshold, control passes to 518. In 518, the batch of bins is provided for processing. For example, the batch of bins is provided to a cluster for optimization. In 520, it is determined whether there are more file names. In the event it is determined that there are more file names, control passes to 502. In the event it is determined that there are not more file names, control passes to 522. In 522, processing is completed.

Figure 6:
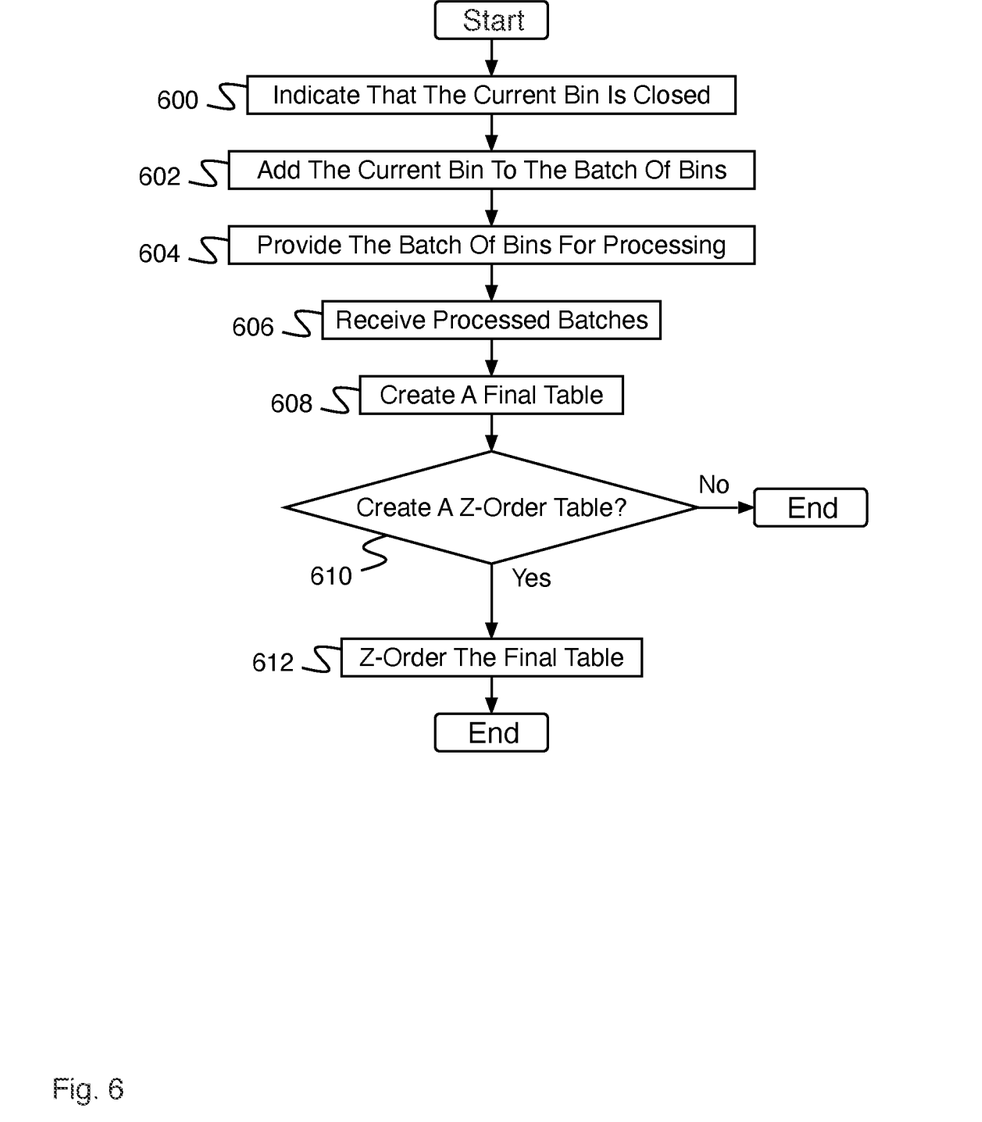
FIG. 6 is a flow diagram illustrating an embodiment of a process for completing processing.

FIG. 6 is a flow diagram illustrating an embodiment of a process for completing processing. In some embodiments, the process of FIG. 6 implements 522 of FIG. 5. In the example shown, in 600, the process indicates that the current bin is closed. In 602, the current bin is added to the batch of bins. In 604, the batch of bins is provided for processing (e.g., providing the batch of bins for processing comprises providing the batch of bins to a cluster for optimization). In 606, processed batches are received (e.g., each processed batch comprising a compacted file). In 608, a final table is created (e.g., based at least in part on the processed batches). In 610, it is determined whether to create a Z-order table. For example, a Z-order table comprises a table with co-located rows with similar column information to improve data-skipping efficiency. In some embodiments, it is determined whether to create a Z-order table based at least in part on a user input. In the event it is determined not to create a Z-order table, the process ends. In the event it is determined to create a Z-order table, control passes to 612. In 612, the final table is Z-ordered.

Figure 7:
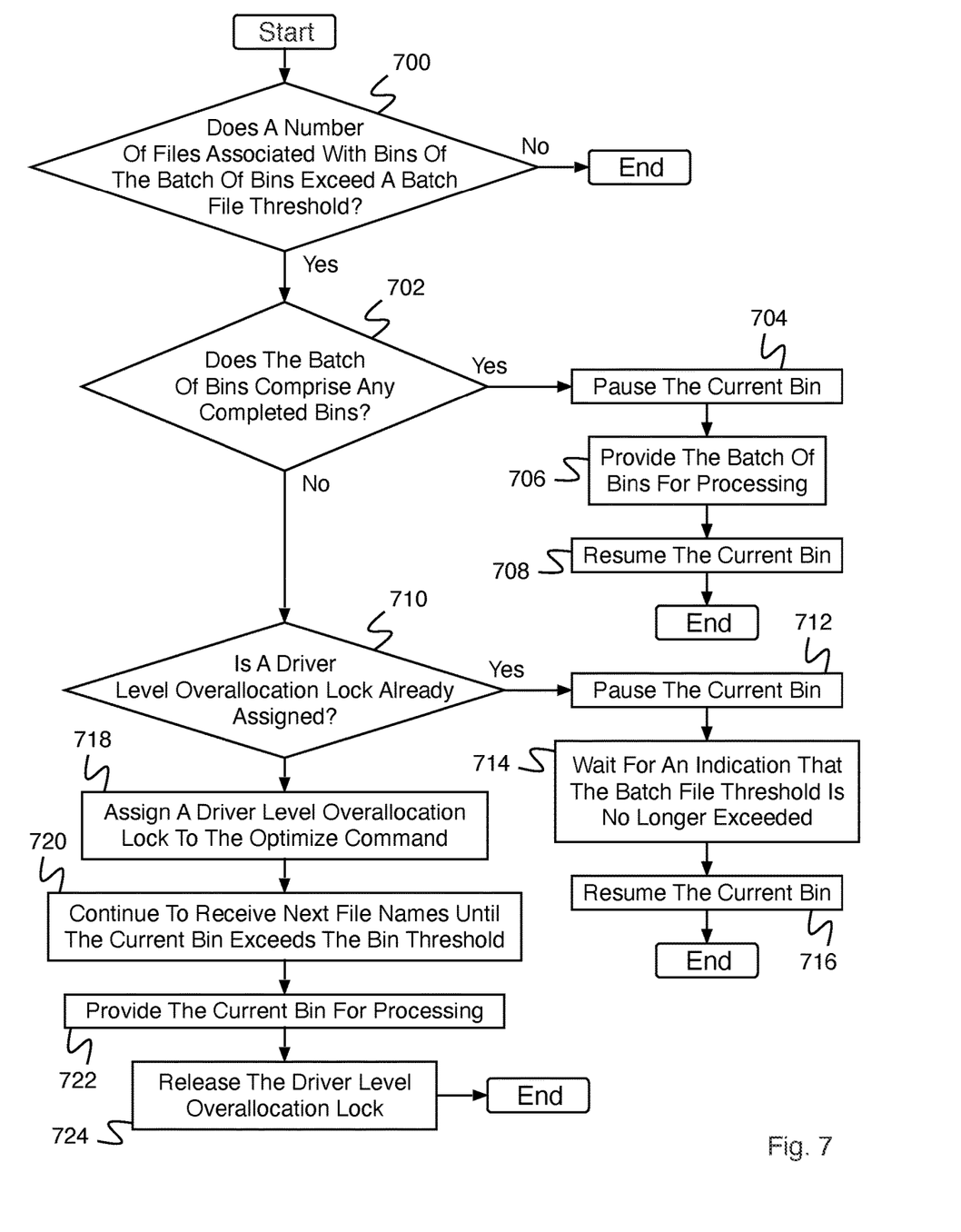
FIG. 7 is a flow diagram illustrating an embodiment of a process for a batch file threshold.

FIG. 7 is a flow diagram illustrating an embodiment of a process for a batch file threshold. In some embodiments, the process of FIG. 7 comprises part of 516 of FIG. 5. In the example shown, in 700, it is determined whether a number of files associated with bins of the batch of bins exceeds a batch file threshold. In some embodiments, the number of files comprises a system-wide number of files (e.g., across instances of an optimize process). In various embodiments, instead of the number of files, bin packing is based on a number of rows, a number of columns, a number of rows and a number of columns, a number of rows times a number of columns, or any other appropriate portion of an array or measure of an array exceeding a threshold. In some embodiments, the bin packing splits files in response to a file having more rows greater than a threshold number of rows. In the event it is determined that a number of files associated with bins of the batch of bins does not exceed a batch file threshold, the process ends. In the event it is determined that a number of files associated with bins of the batch of bins exceeds a batch file threshold, control passes to 702. In 702, it is determined whether the batch of bins comprises any completed bins (e.g., bins that have been completely filled with associated files but not yet processed). In the event it is determined that the batch of bins comprises any completed bins, control passes to 704. In 704, the current bin is paused. In 706, the batch of bins is provided for processing. For example, the batch of bins is provided to a cluster for optimization. In 708, the current bin is resumed, and the process ends. In the event it is determined in 702 that the batch of bins does not comprise any completed bins, control passes to 710. In 710, it is determined whether a driver level overallocation lock is already assigned. In the event it is determined that a driver level overallocation lock is already assigned, control passes to 712. In 712, the current bin is paused. In 714, the process waits for an indication that the batch file threshold is no longer exceeded. For example, the optimize process associated with the driver overallocation lock completes a bin and completes processing of the bin, causing the batch file threshold to no longer be exceeded. In 716, the current bin is resumed, and the process ends. In the event it is determined in 710 that a driver level overallocation lock is not already assigned, control passes to 718. In 718, a driver level overallocation lock is assigned to the optimize command. In 720, the process continues to receive next file names (e.g., and associate them with the current bin if appropriate) until the current bin exceeds the bin threshold. In 722, the current bin is provided for processing. In 724, the driver level overallocation lock is released.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
one or more computer processors; and
one or more computer-readable mediums comprising stored instructions that when executed by the one or more computer processors cause the one or more processors to:
receive an indication to execute an optimize command;
receive a set of files; and
perform the optimize command by determining if addition of a file from the set of files to a current bin causes the current bin to exceed a bin threshold and further comprising instructions that when executed causes the one or more processors to:
add the file to a next bin,
add the current bin to a batch of bins for subsequent processing,
if all the files from the set of files have been assigned to bins, indicate that the current bin is closed, and provide the batch of bins for processing.

2. The system of claim 1, wherein the one or more computer-readable mediums further comprise stored instructions that when executed cause the one or more processors to:
determine that addition of the current bin to the batch of bins causes a measure of the batch of bins to exceed a batch threshold; and
provide the batch of bins to process based on the measure of the batch of bins in excess of the batch threshold.

3. The system of claim 2, wherein the one or more computer-readable mediums further comprise stored instructions that when executed cause the one or more processors to:

provide the batch of bins for processing comprises providing the batch of bins to a cluster for optimization.

4. The system of claim 2, wherein the one or more computer-readable mediums further comprise stored instructions that when executed cause the one or more processors to:
access a subsequent file from the set of files after assigning the next bin as the current bin; and
add the subsequent file to the current bin upon a determination that addition of the subsequent file to the current bin does not cause the current bin to exceed the bin threshold.

5. The system of claim 1, wherein the one or more computer-readable mediums further comprise stored instructions that when executed cause the one or more processors to:
assign the next bin as the current bin if a determination that addition of the file to the current bin causes the current bin to exceed a bin threshold.

6. The system of claim 1, wherein the one or more computer-readable mediums further comprise stored instructions that when executed cause the one or more processors to:
receive processed batches and create a final table based at least in part on the processed batches.

7. A method comprising:
receiving an indication to execute an optimize command;
receiving a set of files;
performing the optimize command by determining if addition of a file from the set of files to a current bin causes the current bin to exceed a bin threshold; and
responsive to determining the addition of the file to the current bin causes the current bin to exceed the bin threshold,
adding the file to a next bin,
adding the current bin to a batch of bins for subsequent processing,
upon determination that all the files from the set of files have been assigned to bins, indicating that the current bin is closed, and
providing the batch of bins for processing.

8. The method of claim 7, further comprising:
determining that adding the current bin to the batch of bins causes a measure of the batch of bins to exceed a batch threshold; and
providing the batch of bins for processing based on the measure of the batch of bins exceeding the batch threshold.

9. The method of claim 8, further comprising: providing the batch of bins for processing comprises providing the batch of bins to a cluster for optimization.

10. The method of claim 8, further comprising:
accessing a subsequent file from the set of files after assigning the next bin as the current bin; and
adding the subsequent file to the current bin upon a determination that addition of the subsequent file to the current bin does not cause the current bin to exceed the bin threshold.

11. The method of claim 7, further comprising:
assigning the next bin as the current bin if a determination that addition of the file to the current bin causes the current bin to exceed a bin threshold.

12. The method of claim 7, further comprising: receiving processed batches and creating a final table based at least in part on the processed batches.

13. A non-transitory computer-readable medium comprising stored instructions that when executed by one or more computer processors of one or more computing devices, cause the one or more processors to:
receive an indication to execute an optimize command;
receive a set of files; and
perform the optimize command by determining if addition of the a file from the set of files to a current bin causes the current bin to exceed a bin threshold and further comprising instructions that when executed cause the one or more processors to:
add the file to a next bin,
add the current bin to a batch of bins for subsequent processing,
upon determination that all the files from the set of files have been assigned to bins, indicate that the current bin is closed, and
provide the batch of bins for processing.

14. The non-transitory computer-readable medium of claim 13, further comprising stored instructions that when executed cause the one or more processors to:
determine that adding the current bin to the batch of bins causes a measure of the batch of bins to exceed a batch threshold; and
provide the batch of bins for processing based on the measure of the batch of bins exceeding the batch threshold.

15. The non-transitory computer-readable medium of claim 14, further comprising stored instructions that when executed cause the one or more processors to: provide the batch of bins for processing comprises providing the batch of bins to a cluster for optimization.

16. The non-transitory computer-readable medium of claim 14, further comprising stored instructions that when executed cause the one or more processors to:
access a subsequent file from the set of files after assigning the next bin as the current bin; and
add the subsequent file to the current bin upon a determination that addition of the subsequent file to the current bin does not cause the current bin to exceed the bin threshold.

17. The non-transitory computer-readable medium of claim 13, further comprising stored instructions that when executed cause the one or more processors to:
assign the next bin as the current bin if a determination that addition of the file to the current bin causes the current bin to exceed a bin threshold.

* * * * *